No. 657,621. Patented Sept. 11, 1900.
H. G. ROTH.
CALCULATING CHEESE CUTTER.
(Application filed June 29, 1900.)
(No Model.) 5 Sheets—Sheet 1.
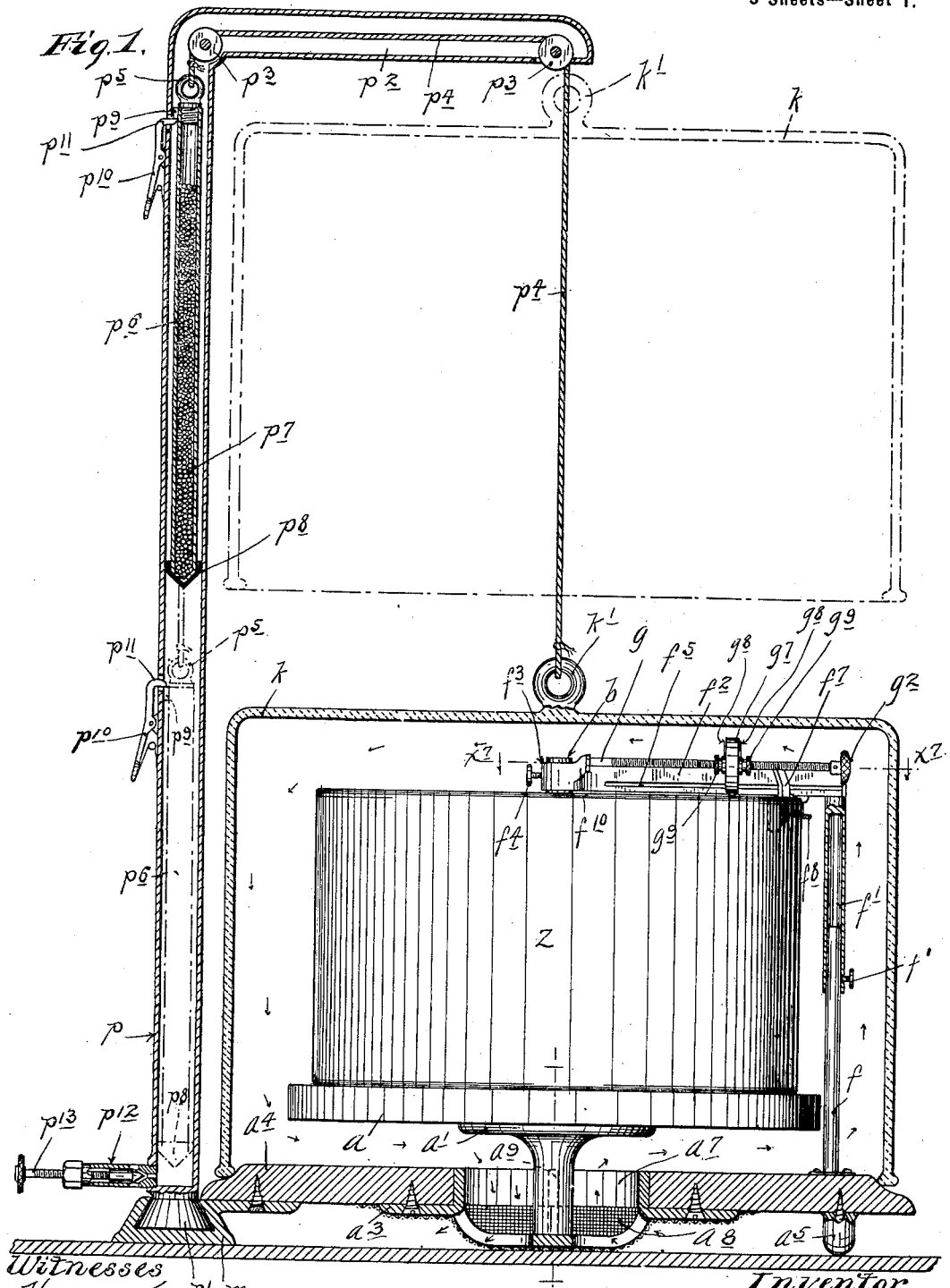
Witnesses
Harry Kilgore
Robert Otto
Inventor.
Henry G. Roth.
By his Attorneys.
Williamson & Merchant

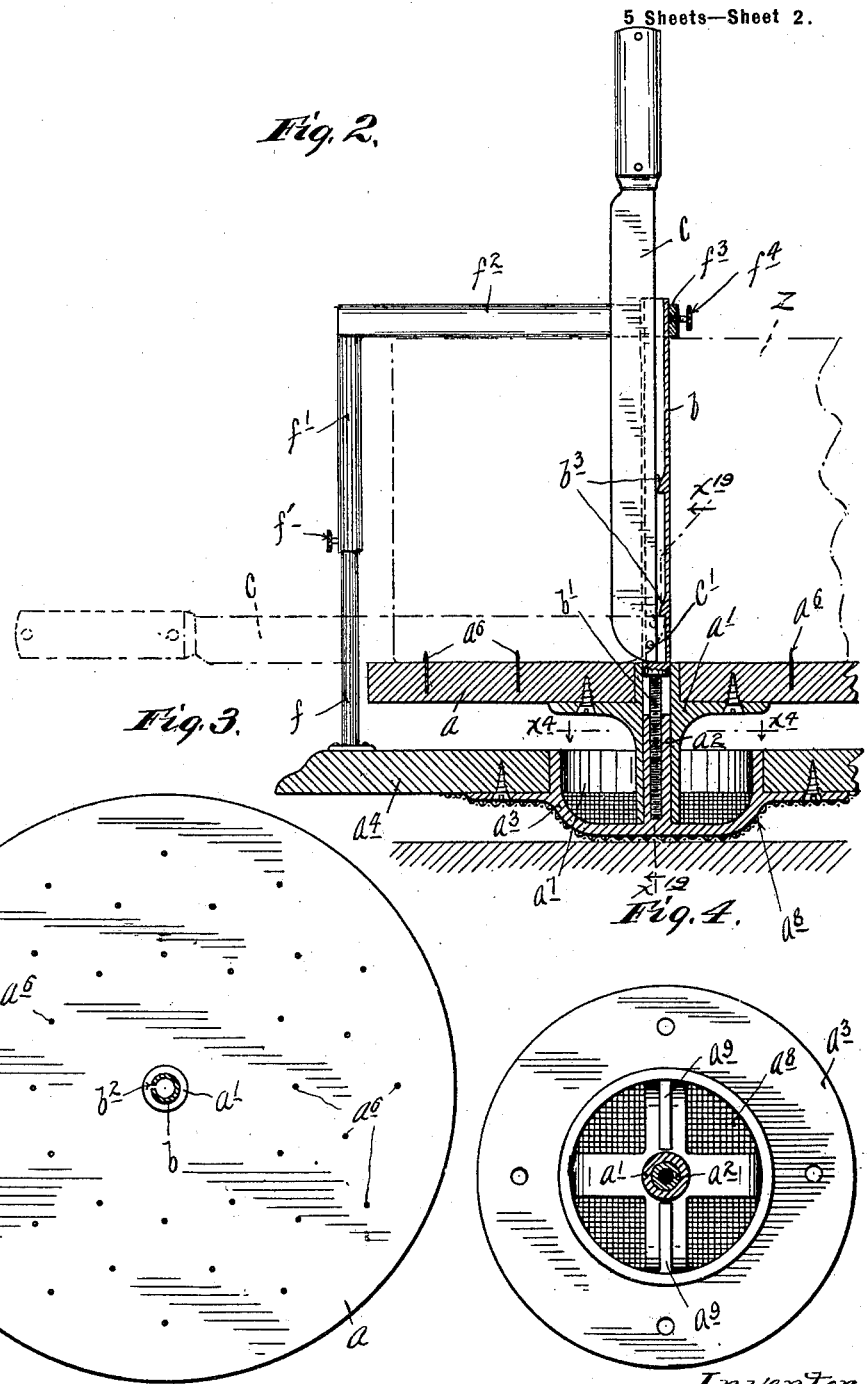

No. 657,621. Patented Sept. 11, 1900.
H. G. ROTH.
CALCULATING CHEESE CUTTER.
(Application filed June 29, 1900.)
(No Model.) 5 Sheets—Sheet 3.
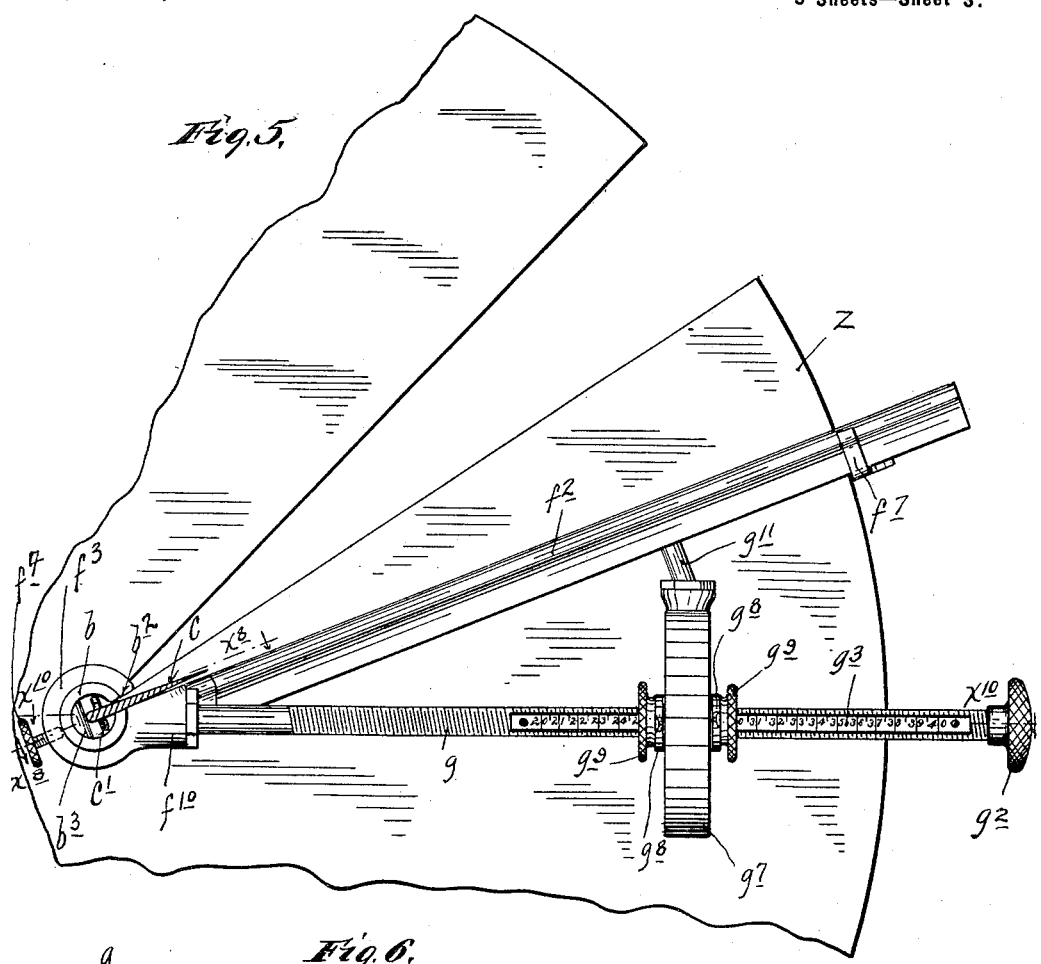
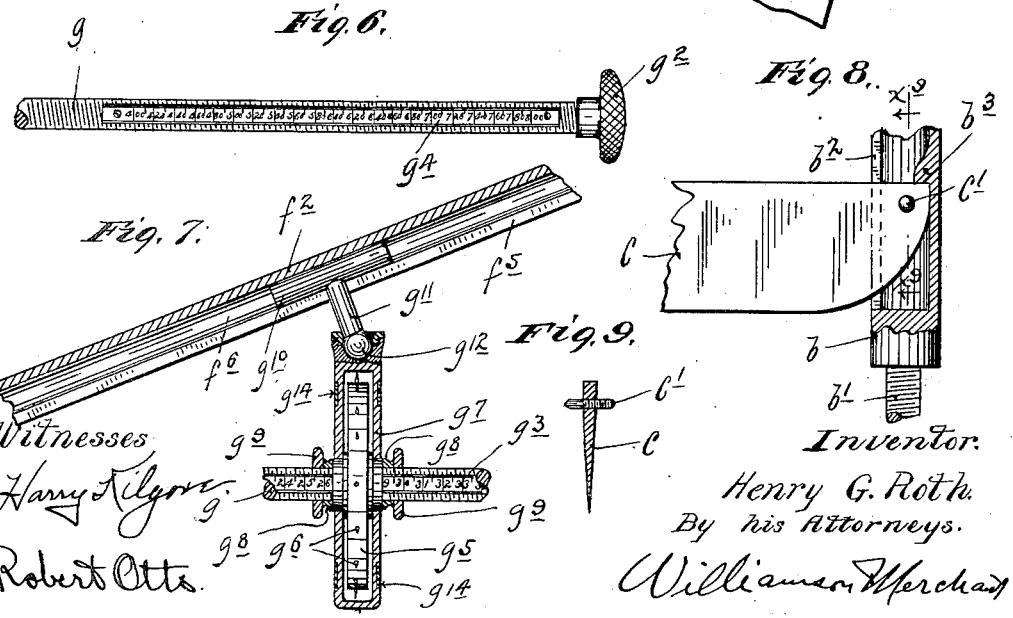
Witnesses
Harry Kilgore
Robert Otts
Inventor.
Henry G. Roth.
By his Attorneys.
Williamson & Merchant No. 657,621. Patented Sept. 11, 1900.
H. G. ROTH.
CALCULATING CHEESE CUTTER.
(Application filed June 29, 1900.)
(No Model.) 5 Sheets—Sheet 4.
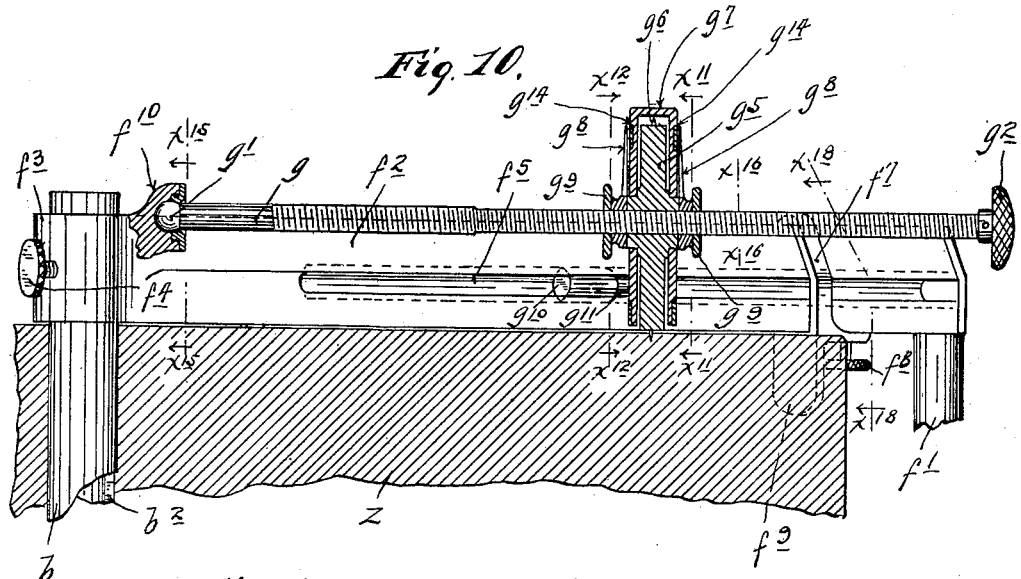
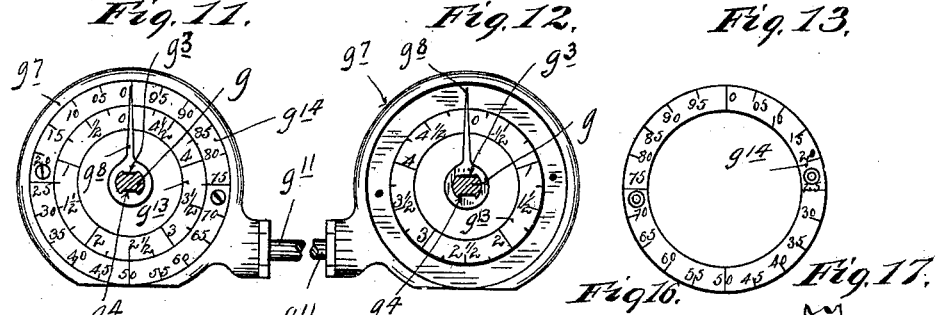
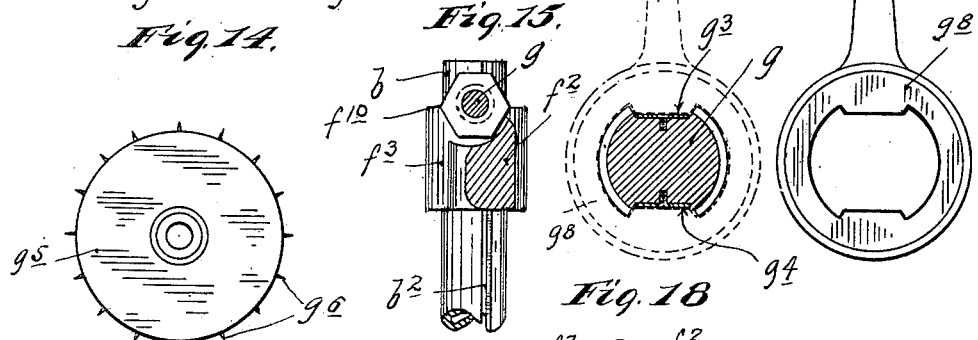
Witnesses
Harry Kilgore
Robert Otto
Inventor
Henry G. Roth.
By his Attorneys.
William & Merchant No. 657,621. Patented Sept. II, 1900.
H. G. ROTH.
CALCULATING CHEESE CUTTER.
(Application filed June 29, 1900.)
(No Model.) 5 Sheets—Sheet 5.
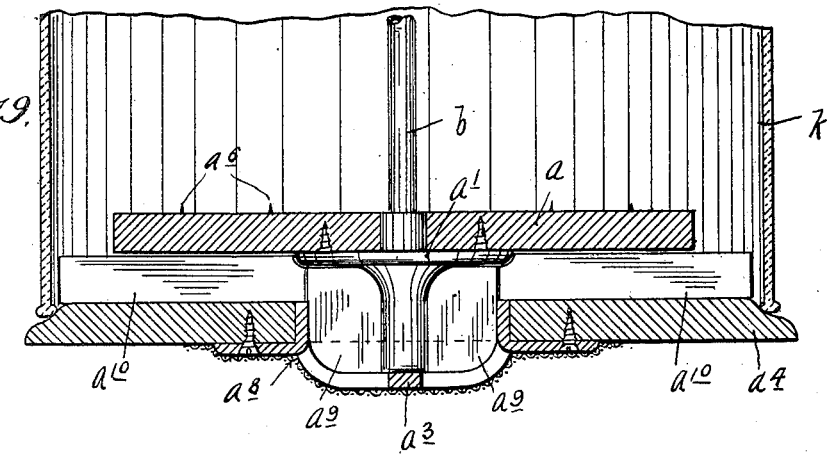
Witnesses.
Harry Kilgore,
Robert Otto.
Inventor:
Henry G. Roth.
By his Attorneys.
Williamson Merchant

UNITED STATES PATENT OFFICE.

HENRY G. ROTH, OF MINNEAPOLIS, MINNESOTA.

CALCULATING CHEESE-CUTTER.

SPECIFICATION forming part of Letters Patent No. 657,621, dated September 11, 1900.

Application filed June 29, 1900. Serial No. 22,021. (No model.)

*To all whom it may concern:*

Be it known that I, HENRY G. ROTH, a citizen of the United States, residing at Minneapolis, in the county of Hennepin and State of Minnesota, have invented certain new and useful Improvements in Calculating Cheese-Cutters; and I do hereby declare the following to be a full, clear, and exact description of the invention, such as will enable others skilled in the art to which it appertains to make and use the same.

My present invention has for its object to provide a calculating cutting device for cheeses of circular cake form; and to this end it consists of the novel devices and combinations of devices hereinafter described, and defined in the claims.

The invention is illustrated in the accompanying drawings, wherein like characters indicate like parts throughout the several views.

Figure 1 is a vertical section taken centrally through my improved device, some parts being shown in full. Fig. 2 is a vertical section taken centrally through certain of the parts shown in Fig. 1, but looking from a reverse direction, and some parts being broken away. Fig. 3 is a plan view of the rotary cheese-table. Fig. 4 is a horizontal section on the line $x^4 x^4$ of Fig. 2, some parts being removed. Fig. 5 is a detail in plan and on an enlarged scale, showing the measuring or calculating device operative on a cake of cheese, some parts being broken away. Fig. 6 is a detail in bottom plan, showing the graduated operating-rod of the calculating device. Fig. 7 is a horizontal section approximately on the line $x^7 x^7$ of Fig. 1, some parts being broken away and others shown in full. Fig. 8 is a detail with some parts broken away and others removed, taken in section approximately on the line $x^8 x^8$ of Fig. 5. Fig. 9 is a section on the line $x^9 x^9$ of Fig. 8, some parts being removed. Fig. 10 is a section on the line $x^{10} x^{10}$ of Fig. 5. Figs. 11 and 12 are vertical sections, respectively, on the lines $x^{11} x^{12}$ of Fig. 10, looking in reverse directions. Fig. 13 is a detail showing one of the so-called "price-rings" removed from working position. Fig. 14 is a view in side elevation, showing in detail the so-called "marking-wheel." Fig. 15 is a transverse section on the line $x^{15} x^{15}$ of Fig. 10. Fig. 16 is a transverse section on the line $x^{16} x^{16}$ of Fig. 10, with one of the indicator-fingers indicated by dotted lines. Fig. 17 is a detail of one of the said indicator-fingers removed from working position, some parts being broken away. Fig. 18 is a section on an irregular line $x^{18} x^{18}$ of Fig. 10. Fig. 19 is a transverse vertical section taken on the line $x^{19} x^{19}$ of Fig. 2, some parts being broken away. Fig. 20 is a plan view of one of the graduated scales for indicating the total weight of the cheese, and Fig. 21 is a plan view of the scale for indicating the total selling price or value of the cheese.

The cake of cheese (indicated by the character $z$) is supported on a rotary disk-like table $a$, provided with a depending central sleeve $a'$, into which telescopes loosely the smaller sleeve $a^2$ of a bracket $a^3$, which in turn is secured to the central portion of a base $a^4$, shown as provided with legs $a^5$, which support the same. The rotary table $a$ is provided with a series of sharp brads $a^6$, which enter the cheese and cause it to rotate. The bracket $a^3$ is formed with quite large passage $a^7$, and the depending open or skeleton portion of the said bracket is covered with a wire-gauze $a^8$, which serves to keep out insects. The concavity of the bracket $a^8$ is bisected by a pair of flanges $a^9$, that terminate at their inner ends close to the rotary sleeve $a'$ and extend vertically close to the bottom of the rotary table $a$. Partition-strips $a^{10}$ extend outward in diametrically-opposite directions over the upper surface of the base $a^4$, as best shown in Fig. 19. The purpose of these partitions $a^9$ and $a^{10}$ will be given later.

To properly locate the cake of cheese on the table $a$, a round hole is cut through its axis and a centering-tube $b$ is then passed therethrough. This centering-tube $b$ fits into the upper end of the sleeve $a'$ and is provided with a screw-threaded stem $b'$, which works adjustably by screw-threaded engagement in the stationary sleeve $a^2$. This tube $b$ is held against rotation, as presently noted, and it is provided with a longitudinal slit $b^2$, extending from its top nearly or quite to its lower end. Through this slot $b^2$ the end of a knife $c$ is adapted to be inserted, as shown in Fig. 2. To prevent the end of the knife from being withdrawn from the slot, it is provided with a pin or projection $c'$ at its point, which pin is adapted to be inserted into the tube $b$ only through the upper end thereof. For coöperation with the point of the knife the tube $b$ is provided with internal fulcrum-lugs $b^3$.

The base $a^4$ is provided at one side, just outward of the table $a$, with a post or standard $f$, over the upper end of which telescopes a sleeve $f'$, adjustably set by a screw $f'$ and rigidly or integrally connected at its upper end to the outer end of a radial straight-edge or guide $f^2$, the inner end of which is formed with a head $f^3$, through which the upper end of the centering-tube $b$ telescopes. A thumb-screw $f^4$, working through the head $f^3$ and impinging on the tube $b$, together with the thumb-screw $f^2$ in the sleeve $f'$ just noted, serves to hold the straight-edge $f^2$ in its proper vertical adjustment, with its under surface close to but out of engagement with the upper surface of the cheese. In one side the straight-edge $f^2$ is formed with a longitudinally-extended slot $f^5$, which is expanded or enlarged within the body of said straight-edge to form a longitudinally-extended bore or passage $f^6$.

Mounted to slide on the outer end of the straight-edge $f^2$ is a clamp $f^7$, adjustably held by a thumb-screw $f^8$ and provided with a depending flange $f^9$, which when properly adjusted lies close to the outer surface of the cake of cheese, for a purpose which will hereinafter appear. The operating-rod $g$ is screw-threaded, and at its inner end it is formed with a ball $g'$, which is swiveled for rotary and for a limited vertical movement in a socket $f^{10}$ of the head $f^3$, heretofore noted. At its outer end the rod $g$ is shown as provided with a detachable handpiece $g^2$.

Countersunk in the rod $g$, below the screw-threads thereof, is a pair of longitudinally-extended scale-bars $g^3$ and $g^4$, graduated as hereinafter specified. Working with screw-threaded engagement on the rod $g$ is a measuring-wheel $g^5$, provided with sharp peripheral brads $g^6$, which engage into the upper surface of the cheese. A case or housing $g^7$ incloses all but the extreme lower portion of the wheel $g^5$, the sides thereof being mounted on the projecting trunnions or hubs on said wheel, as best shown in Fig. 10. On each side of the case $g^7$ is an indicator-finger $g^8$, the inner end of which is expanded and perforated, as best indicated in Fig. 17, so as to loosely fit over the grooved portion of the rod $g$ in such manner that it cannot turn. By means of nuts $g^9$, working on the rod $g$, the fingers $g^8$ are adapted to be clamped against the hubs of the wheel $g^5$, so that the said rod $g$, wheel $g^5$, fingers $g^8$, and nuts $g^9$ are locked and caused to turn together. The case $g^7$ is held against rotation by means of a sliding plunger $g^{10}$, mounted to work in the bore $f^6$ of the straight-edge $f^2$ and provided with a neck $g^{11}$, that projects through the longitudinal slot $f^5$ and is connected to the said case $g^7$ by a ball-and-socket joint $g^{12}$. (Best illustrated in Fig. 7.)

For coöperation with each finger $g^8$ the adjacent side of the case $g^7$ is provided with two graduated rings $g^{13}$ and $g^{14}$. The purpose of graduating both sides of the case $g^7$ and providing two fingers $g^8$ is to enable both the salesmen from the inside of the counter and the purchaser from the outside of the counter to readily read the indication; but hereinafter the said devices will for the sake of brevity be referred to in the singular.

*Scale-graduations.*—The scale-bar $g^3$ on the operating-rod $g$ is in the illustration given graduated from "20" to "40" to indicate the number of pounds of various cakes of cheese. The twenty-pound graduation indicates a position just one-half as far from the axis of the centering-tube $b$ as does the forty-pound graduation. Hence when the measuring-wheel $g^5$ is set for action on a twenty-pound cheese it will be moved but one-half as far under a complete rotation of the cheese as it will when it is set for action upon a forty-pound cheese. The measuring-wheel $g^5$ may have any desired diameter; but, as illustrated, it is shown of such diameter that it will be given one complete rotation when properly set each time the cake of cheese is moved the distance occupied by a five-pound segment of the cake. Otherwise stated, the diameter of the said wheel $g^5$ is one-fourth the diameter of the circle traveled by the said wheel over the cake of cheese when set according to the twenty-pound graduation. In setting the wheel the outer surface of the outer nut $g^9$ is alined with the graduation on the bar $g^3$ which corresponds to the total weight of the cheese. For instance, in Fig. 5 a device is shown as set for action on a thirty-pound cheese. The ring $g^{13}$ on the case $g^7$ is graduated and marked from "1" to "5," indicating pounds and fractions thereof, and as this ring $g^{13}$ answers for a cake of any weight it may be formed integrally with or marked directly on the case $g^7$. The bar $g^4$ of the rod $g$ is graduated and marked to indicate the total value or total selling price of various cakes of cheese, varying from four to eight dollars, by amounts differing, successively, by twenty cents. These amounts may be varied; but in the illustration given the graduations of the scale $g^4$ correspond in extent and in spacing, but not of course in notations, to the scale-bar $g^3$. Again, in the illustration given the scale-bar $g^4$ and the ring $g^{14}$ are graduated for cheese to be sold per weight of twenty cents per pound. Thus comparing the scales $g^3$ and $g^4$ a twenty-pound cheese at twenty cents a pound should sell for four dollars, while considering the other extremes of the scale a forty-pound cheese at twenty cents per pound should bring eight dollars, and so on throughout the scale. These calculations may be readily read by comparing the graduation of the two scales alined with the outer nut $g^9$. Inasmuch as the wheel $g^5$ will be given one complete rotation when properly set, as already indicated, by the movement of a five-pound segment of cheese under the same and inasmuch as five pounds of cheese at twenty cents per pound should bring one dollar, the ring $g^{14}$ is graduated in five-cent units of one dollar, as best shown in Fig. 13.

Operation: To cut the cheese, the knife is inserted substantially as shown by full lines in Fig. 2. The point of the same is engaged under one of the fulcrum-lugs $b^3$ and then is moved pivotally downward until it reaches the position shown by the dotted lines in said figure. If the cheese is large, it may be cut by two operations, the first being accomplished by engaging the point of the knife under the upper lug $b^3$ and the final cut by the operation already described. The knife is arranged to cut against the forward and adjacent edge of the straight-edge $f^2$, and the said straight-edge insures the proper segment of cheese always being cut. The flange $f^9$ of the bracket $f^7$ serves to hold the last few segments of the cheese and to prevent the same from being tilted by the action of the knife in cutting the same. When the measuring-wheel $g^5$ and case $g^7$ are moved on the rod $g$, the plunger $g^{10}$ and its neck $g^{11}$ follow the same, and the slightly-varying angle between the neck $g^{11}$ and case $g^7$ is permitted by the ball-and-socket joint $g^{12}$.

As an illustration of a specific use of the device let it be assumed that the cheese weighs thirty pounds and that the price is twenty cents per pound and that the purchaser wishes two pounds. In this case the wheel is set, as indicated in Fig. 5, at thirty pounds on scale $g^3$ and at the six-dollar mark on the scale $g^4$, and the cheese is then turned far enough to move the pointer $g^8$ over two of the pound graduations of the ring $g^{13}$. The pointer $g^8$ will then also indicate the value of two pounds of the cheese as forty cents on the ring $g^{14}$. Hence if the purchaser wished forty cents' worth of the cheese the same operation would have been performed. The knife is then depressed and the segment of cheese is cut. The next purchaser may desire twenty-five cents' worth of cheese, and for this operation the knife is withdrawn, the operating-rod $g'$ is elevated by the knob $g^2$ high enough to raise the brads $g^6$ of the marking-wheel $g^5$ out of contact with the cheese, and while in this position the operating-rod is turned until the pointer $g^8$ is reset at zero, as shown in Fig. 11. Then the rod is depressed or thrown back into an operative position on the cheese, and the cheese is then turned far enough to move the pointer $g^8$ over to the twenty-five-cent mark on the ring $g^{14}$, the pointer $g^8$ indicating as well the weight of the segment of cheese on the ring $g^{13}$ as one and one-quarter pounds. The knife is then again depressed as before and the segment of cheese is cut. Thus it will be seen that by this device both value and weight are indicated at the same time. By providing a series of graduated rings $g^{14}$ variously marked for cheese to be sold at different prices per pound absolute accuracy in the calculations may be made. The price-scale $g^4$ in this instance is not required, it being only necessary to set the marking-wheel $g^5$ to correspond to the weight of the cheese, as indicated on the total-weight scale $g^3$. If, however, the cheese is to be cut or sold by price regardless of weight, the price-scale $g^4$ on the operating-rod $g$ and the price-ring $g^{14}$ on the dial or case $g^7$ is all that is required. To illustrate: A forty-pound cheese at ten cents per pound would be worth four dollars, or the same as a twenty-pound cheese at twenty cents per pound. Hence if the cheese is to be sold by price the measuring-wheel should be set at the four-dollar mark on the scale $g^4$. If ten cents' worth is to be cut, the cheese should be turned far enough to register ten cents on the price-ring $g^{14}$, so that said measuring-wheel spaces off a one-fortieth segment of the entire cheese. It matters not what the weight or price of a cheese may be, so long as the cheese is worth four dollars, inasmuch as for ten cents, for instance, the purchaser should secure a one-fortieth segment of cheese. Hence it will be seen that the price-ring $g^{14}$ and the price-scale $g^4$ will answer for any weight and price of cheese, so long as the total value of the cheese is not more or less than the amount indicated on the price-scale $g^4$, which in the illustration given is from four dollars to eight dollars. The price-ring $g^{14}$ and price-scale $g^4$ may be graduated to any price or value so long as they are graduated to correspond in value.

The pin $c'$ may be removed from the knife $c$, in which case the knife may be used as an ordinary knife, while the point thereof may nevertheless be guided by the slot $b^2$ of the centering-tube $b$.

As is usual, I provide a cover or bell $k$, preferably of glass, for inclosing and protecting the cheese, which cover rests upon the peripheral portion of the base $a^4$ and incloses also the cutting mechanism above described. In connection with the cover $k$ I provide a novel device for supporting and controlling the same. In a socket $m$, secured to the base $a^4$ and assisting in supporting the same, the lower end of a tubular standard $p$ is swiveled, as shown at $p'$. The upper end of this standard $p$ is provided with a tubular horizontal arm or extension $p^2$, in which guide-sheaves $p^3$ are mounted, as shown in Fig. 1. A cord or flexible connection $p^4$ runs over the sheaves $p^3$, being attached at one end to an eye $k'$ of the cover $k$ and at its other end to an eye $p^5$ of a counterweight $p^6$, which works vertically within the standard $p$. This weight $p^6$ is preferably made hollow and filled with shot, as indicated at $p^7$. At its lower end it is provided with a conical tip $p^8$ and at its upper end with a lug $p^9$. A pair of spring-pressed latches $p^{10}$ are pivoted to the standard $p$, with their cam-beaks $p^{11}$ projecting through perforations therein and adapted for engagement with the lug $p^9$ of the weight $p^6$. The peripheral portion of the cap $p^8$ at the lower end of the weight $p^6$ fits closely within the standard $p$, so that it acts after the manner of a piston. At the lower end of a standard $p$ is an air tube or nipple $p^{12}$, in which is a needle-valve $p^{13}$, by means of which the supply of air into the lower end of the standard under the upward movement of the weight $p^6$ may be varied. Preferably the cap $p^8$ is of flexible material arranged to operate after the manner of an ordinary bicycle-pump piston, so that air will escape around the same readily when the weight is lowered. The cover $k$ is slightly heavier than the weight $p^6$, so that the cover being released while in an upper position will move slowly downward, its movement being retarded by the passage of air into the lower end of the standard $p$, and by means of the valve $p^{13}$ the rate at which it may be moved may be varied. When the cover $k$ is raised and the weight $p^6$ lowered, the lug $p^9$ is engaged by the lower latch $p^{10}$ and the parts are held as shown by dotted lines in Fig. 1. The lower latch being released the weight and cover will be released and, as already indicated, will move into the positions indicated by full lines in Fig. 1, in which position the upper latch $p^{10}$ will engage the lug $p^9$ of the weight $p^6$. When moving downward, the lug $p^9$ has a cam action on the beak of the lower latch $p^{10}$, and when moving upward it has a light camming action on the beak of the upper latch. When the cover $k$ is raised, it may be swung sidewise from a position over the cake of cheese by the pivotal movement of the standard $p$ on its swivel $p'$. Hence it will be seen that the standard and its connections serve as a miniature derrick to elevate and support the cover $k$. A continuous circulation of air is permitted within the cover $k$ through the meshes of the screen $a^8$, and the partitions $a^9$ $a^{10}$ heretofore noted, dividing, as they do, the lower portion of the inclosed compartment containing the cheese, will cause air to pass upward for contact with cheese.

It will of course be understood that the device is adapted for cutting various other articles—such, for instance, as butter—and hence is not limited to a cheese-cutter.

What I claim, and desire to secure by Letters Patent of the United States, is as follows:

1. A device for measuring cheese, &c., comprising a wheel guide or support securable radially of the cheese and marked to indicate the total cheese, by weight or value, a measuring-wheel adjustable on said guide, for contact with the cheese at various radial points, and an indicator actuated by said measuring-wheel and marked to indicate fractions or subdivisions of the cheese, substantially as described.

2. The combination with a rotary support for the cheese, of a measuring device comprising a wheel guide or support securable radially over the cheese and marked to indicate the total cheese, by weight or value, a measuring-wheel adjustable on said guide, for contact with the cheese at various radial points, and an indicator actuated by said measuring-wheel and marked to indicate fractions or subdivisions of the cheese, substantially as described.

3. The combination with a rotary support and a non-rotary centering-tube, of a measuring device comprising a radial wheel guide or support marked to indicate the total cheese, by weight or value, a measuring-wheel adjustable on said guide for contact with the cheese, a relatively-fixed radial straight-edge overlying the cheese, and an indicator actuated by said measuring-wheel and marked to indicate fractions or subdivisions of the cheese, substantially as described.

4. The combination with a rotary table or support and a non-rotary centering-shaft, of a relatively-fixed straight-edge radiating from said centering-shaft, a knife guided by said centering-shaft and coöperating with said straight-edge, and a measuring device comprising a graduated radial wheel guide or support marked to indicate the total cheese by weight or value, a measuring-wheel adjustable on said guide for contact with the cheese, and an indicator actuated by said measuring-wheel and marked to indicate fractions or subdivisions of the total cheese, substantially as described.

5. The combination with a table or support for the cheese and a centering-shaft rising axially therefrom, of a straight-edge radiating from said centering-shaft, a pivotal guide-rod also radiating from said centering-shaft marked to indicate the total cheese as by weight or value, a rotary measuring-wheel adjustable on said measuring-rod for contact with the cheese, an indicator actuated by said measuring-wheel and marked to indicate fractions or segments of the cheese, and a connection tying said straight-edge and measuring-rod together, substantially as described.

6. The combination with the rotary table $a$ and the non-rotary centering shaft or tube $b$, of the straight-edge $f^2$ having the head $f^3$ secured to said shaft $b$ and supported at its outer end, the graduated and screw-threaded measuring-rod $g$ swiveled to said head $f^3$, the measuring-wheel $g^5$ and pointer $g^8$ adjustably securable on said rod $g$, the case $g^7$ embracing said wheel $g^5$, and the connection $g^{11}$ mounted to slide longitudinally of said straight-edge $f^2$ and connected to the case $f^7$, substantially as described.

7. The combination with the table $a$ and centering shaft or tube $b$, of the straight-edge $f^2$ having the head $f^3$ adjustably secured on said shaft $b$, and the telescoping connection $f, f'$, adjustably supporting the outer end of said straight-edge, whereby said straight-edge may be adjusted close to the top of said cheese, substantially as described.

8. The combination with a support for the cheese, of a cheese-cover, and means for supporting and controlling said cover, comprising the tubular standard, the counterweight working in said standard and connected to said cover, means for latching said counterweight in position to hold said cover elevated, and a valve controlling the admission of air into said standard, to regulate the descent of said cover when released, substantially as described.

9. The combination with a support and a cover for a cake of cheese, of an oscillating standard or support, and the counterweight working in said standard and provided with connections to the said cover, substantially as described.

10. The combination with the cover $k$, of the tubular standard $p$ with extended upper end $p^2$ having the guide-sheaves $p^3$, the counterweight $p^6$ working within said standard $p$ as a piston but having less weight than said cover, and the valve controlling the inlet of air to the lower end of said standard, said parts operating substantially as described.

11. The combination with the base $a^4$ provided with the central air-passage divided by a diametrically-extended partition, of the table supporting the cheese above said base, and the cover $k$ inclosing said table and the cheese supported thereby, substantially as described.

12. A device for measuring cheese comprising a support for the cheese, the centering-shaft $b$ rising from said support and provided with the head $f^3$, the screw-threaded rod $g$ swiveled to said head $f^3$ at its inner end and provided with scale-graduations indicating both the total weight and total value of the cheese, the measuring-wheel $g^5$ adjustable on said rod $g$, the pointer or finger $g^8$ adjustable with said wheel $g^5$, clamping-nuts $g^9$ for locking said parts $g^5$ and $g^8$ on said rod $g$, and a non-rotary support adjustable on said rod $g$ and provided with the pound and price graduations $g^{13}$ and $g^{14}$ coöperating with said finger $g^8$, substantially as described.

In testimony whereof I affix my signature in presence of two witnesses.

HENRY G. ROTH.

Witnesses:
A. P. T. SUFFEL,
NORMAN JENSEN.